No. 808,013. PATENTED DEC. 19, 1905.
E. E. COOK.
RADIAL TRUCK FOR TRAMWAY AND LIKE VEHICLES.
APPLICATION FILED AUG. 21, 1905.
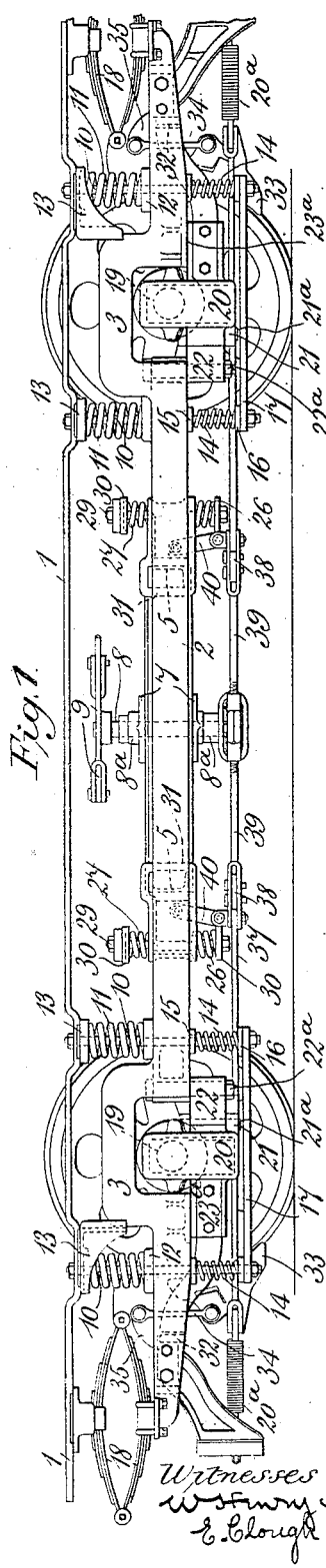
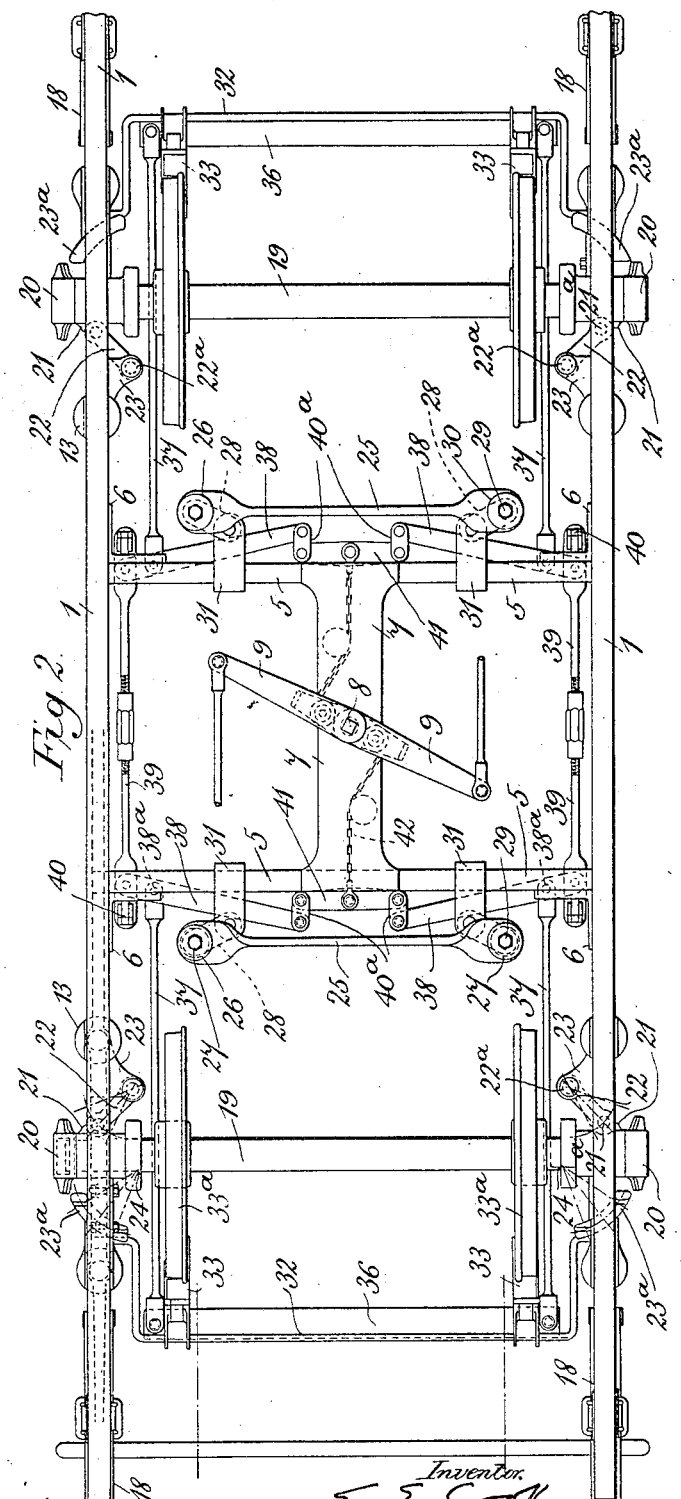

UNITED STATES PATENT OFFICE.

ELMER ELSWORTH COOK, OF LOUGHBOROUGH, ENGLAND.

RADIAL TRUCK FOR TRAMWAY AND LIKE VEHICLES.

No. 808,013.  Specification of Letters Patent.  Patented Dec. 19, 1905.

Application filed August 21, 1905. Serial No. 274,981.

*To all whom it may concern:*

Be it known that I, ELMER ELSWORTH COOK, a citizen of the United States of America, residing at Loughborough, in the county of Leicester, England, have invented Improvements in Radial Trucks for Tramway and Like Vehicles, of which the following is a specification.

This invention has reference to improvements in that kind of truck commonly called a "radial" truck for tramway and like vehicles, wherein the axles are journaled in axle-boxes that are so connected to the frame of the truck—as, for example, by horizontal links inclined to the longitudinal axis of the vehicle—that when the vehicle enters or leaves a curved portion of the track radial movement of its axles will take place automatically under the control of the connecting means in order to permit of the carrying-wheels of the vehicle automatically adapting themselves to the portions of the track over which the vehicle is traveling, and so promote easy running of the vehicle, and also wherein the brake apparatus for the truck comprises brake-blocks that are so supported and are so connected to the brake-operating mechanism that the brake-blocks can move radially with the axles, so that the brake-blocks can be effectually applied to the traveling wheels of the vehicles in all radial positions of the axles.

Now the present invention has reference to improvements in the mounting of the vehicle-truck upon and the connection thereof to the axle-boxes in which the radial axles are journaled and to improvements in the construction and arrangement of the brake apparatus of such trucks, the object being to simplify the construction, cheapen the cost of manufacture, and reduce the cost of maintenance of such trucks. It also has reference to various novel features of construction and to combinations and arrangements of parts, all as hereinafter more particularly described, and set forth in the claims. According thereto and for the purposes mentioned a radial truck of the kind referred to is constructed, as will now be described with reference to the accompanying illustrative drawings, wherein—

Figures 1 and 2 are respectively a side elevation and a plan of a truck embodying the present improvements.

In the construction illustrated the truck proper is in itself well known and has long been in use and comprises two upper longitudinal side members 1, upon which the sill of the car-body rests, and two lower longitudinal side members 2, each of the lower side members 2 being formed toward each end thereof with a yoke 3. The two lower longitudinal side members 2 are connected together near the central portion of their length by two transversely-arranged members 5, which comprise beams of channel-section connected to the side members 2 by angle-irons 6 and spaced at a suitable distance apart. Secured to the upper and lower sides of the transversely-arranged members 5 and about midway of their length are plates 7. In each of these plates and midway of the transversely-arranged members 5 is formed a bearing $8^a$ for a vertically-arranged shaft 8, whose upper end is secured to the equalizing-bar 9 of the brake-gear.

Extending downward from each upper longitudinal side member 1 and toward each end thereof are rods 10. These rods 10 are arranged one at each side of each yoke 3 and extend through and below the lower longitudinal side member 2. The rods are surrounded at that portion of their length which is between the lower face of the upper side member 1 and the upper face of the lower side member 2 by coiled springs 11, that are seated in spring-holders 12 and 13, secured to the upper and lower faces of the lower and upper side members 2 and 1, respectively. The portions of the rods 10 that extend below the lower side members 2 are surrounded by coiled springs 14, that are seated in spring-holders 15 and 16, secured to the lower face of the lower side members and to the rods themselves, respectively. The lower ends of each pair of rods are connected together by a longitudinally-arranged bar 17. The ends of the upper side members 1 that overhang the ends of the lower side members 2 are supported by laminated plate-springs 18, carried by the lower side members 2.

Each end of each axle 19 is mounted in a single axle-box 20. The yokes 3 in the lower side members 2 are so made that the distance between the adjacent edges of the vertical parts thereof will permit of sufficient radial movement of the axle-boxes 20 in a horizontal plane. Each axle-box 20 is provided on its side nearest the center of the vehicle with a lug or, as shown, with a pair of lugs or projections 21, to which one end of a link 22 is pivotally connected by a vertical pin $21^a$. The other end of the link 22 is pivotally connected by a pin $22^a$ to a lug 23 on the inner side of the lower side member 2. The disposition of the lugs or projections 21 on each axle-box 20 is such that the link 22 is wholly below the lower side member 2. The links 22 are so arranged that they are at an angle to the axle 19 and incline inwardly toward the longitudinal axis of the vehicle. The side of each axle-box 20 opposite the side to which the link 22 is pivotally connected is provided with an extension or bracket 23ª, that extends longitudinally of the vehicle and under the lower side member 2. This extension or bracket 23ª engages with the lower side member 2, and the two are formed with coacting surfaces, so that the frame of the truck is supported upon the four lateral extensions or brackets 23ª of the four axle-boxes. The coacting surfaces may be of any suitable shape. For example, the lower side member 2 may have a part that, as seen in cross-section, is of inverted-V formation, the part of the bracket 23ª that coacts therewith being shaped to correspond. In the example the two coacting parts in each set of such parts are formed as segments of a circle or ellipse the center of which is at the point 24. The links 22 may advantageously and as shown be each mounted to fit between the lugs 21 on the corresponding axle-box 20 and to bear against the under side of the corresponding lug 23 on the truck-frame, so that the several links 22 will assist in transmitting the weight of the truck-frame and attached parts to the axle-boxes 20, and thus to the wheel-axles.

The electric motors (not shown) are each mounted, as usual, at one side on the corresponding axle. The inner end of the motor-frame is supported by and connected to a transversely-arranged bar 25, that is mounted at each end between coiled springs 26 27. Each bar 25 is connected at each end by a link 28, that is at an angle to the longitudinal axis of the vehicle, to one of the transversely-arranged members 5. The links 28 are mounted at their outer ends on pins 29, that pass through the springs 26 and 27 and carry spring-holders 30 therefor. The inner ends of the links 28 are pivotally connected to brackets 31, secured to the transversely-arranged members 5. In some cases springs 20ª may be provided to assist the parts to return to their normal position.

In brake apparatus for a radial truck according to this invention the brake-blocks for each pair of traveling wheels are carried by supports rigidly connected to the axle-boxes of the corresponding axle, so that they will share in the radial movement of such axle-boxes, axle, and wheels and are arranged to be applied to and taken off the said wheels through any suitable brake-actuating mechanism, which may be suspended from the truck-frame and be arranged to be operated by an equalizing-lever under the control of the driver of the vehicle, as heretofore. In the example shown the pair of brake-blocks 33 for each pair of traveling wheels 33ª is suspended by a pair of links 34 from a pair of brackets 35, fixed to a frame 32, that extends transversely of the vehicle and is fixed to the inner sides of the longitudinally-extending brackets 23ª of the corresponding pair of axle-boxes 20. The brake-blocks 33 for each pair of wheels are also connected together by means of a transverse bar 36, that is connected at its ends by links 37 to transversely-arranged levers 38 at points 38ª between their ends. The levers 38, of which there are four, are according to this invention pivoted at their outer ends to longitudinally-arranged rods 39, of which there are two. These rods 39 are suspended by links 40 from the transversely-arranged members 5 of the truck-frame. The inner ends of each pair of levers 38 are, as heretofore, connected by links 40ª to a bar 41, that is connected by a chain 42 to the equalizing-bar 9. It will be seen that with this arrangement the brake-gear is perfectly compensated.

It will be understood that when a vehicle provided with radially-movable axles mounted as described enters a curve or turnout the ends of the axles will be caused to travel in the arcs of circles, so as to allow of the axles and carrying-wheels automatically adjusting their positions relatively to the truck-frame to suit the track over which the vehicle is traveling. It will also be understood that the brake-blocks will move with the axles and be always in a position to properly engage the wheels. It will also be understood that the mode of mounting the truck-frame on and connecting it to the radially-movable axle-boxes hereinbefore described may be used in connection with vehicles having trucks proper of a kind other than that hereinbefore described.

What I claim is—

1. A radial truck comprising a frame, radially-movable axles and axle-boxes carried by said axles, said axle-boxes having lateral extensions which are longitudinal to the truck and by and on which said frame is supported and is adapted to slide.

2. A radial truck comprising a frame, radially-movable axles, and axle-boxes carried by said axles, said axle-boxes having lateral extensions which are longitudinal to the truck and by and on which said frame is supported and is adapted to slide and the portions of said frame and extensions that are in contact having interengaging parts adapted to guide their relative movements.

3. A radial truck comprising a frame, radially-movable axles, axle-boxes carried by said axles, and for each of said axle-boxes a link pivotally connected thereto at one side thereof, each of said axle-boxes having at the other side thereof an extension which is longitudinal to the truck and by and on which said frame is supported and is adapted to slide.

4. A radial truck comprising a frame, radially-movable axles, axle-boxes carried by said axles, and for each of said axle-boxes a link pivotally connected thereto at one side thereof, each of said axle-boxes having at the other side thereof an extension which is longitudinal to the truck and by and on which said frame is supported and is adapted to slide and the portions of said frame and extension that are in contact having interengaging parts adapted to guide their relative movements.

5. A radial truck comprising a frame, radially-movable axles, axle-boxes carried by said axles, and for each of said axle-boxes a link of which one end is pivotally connected to the corresponding axle-box and a vertical pin by means of which the other end of said link is pivoted to said frame, which rests on said link, each of said axle-boxes having at its side opposite to said link an extension which is longitudinal to the truck and by and on which said frame is supported and is adapted to slide.

6. A radial truck comprising a frame, radially-movable axles, axle-boxes carried by said axles, and for each of said axle-boxes a link of which one end is pivotally connected to the corresponding axle-box and a vertical pin by means of which the other end of said link is pivoted to said frame, which rests on said link, each of said axle-boxes having at its side opposite to said link an extension which is longitudinal to the truck and by and on which said frame is supported and is adapted to slide and the portions of said frame and said extension having interengaging parts adapted to guide their relative movements.

7. A radial truck comprising a frame, radially-movable axles, axle-boxes carried by said axles, and for each of said axle-boxes a link pivotally connected thereto at the side thereof toward the center of the truck, each of said axle-boxes having at the other side thereof an extension which is longitudinal to the truck and by and on which said frame is supported and is adapted to slide.

8. A radial truck comprising a frame, radially-movable axles, axle-boxes carried by said axles, and for each of said axle-boxes a link pivotally connected thereto at the side thereof toward the center of the truck and the portions of said frame and extension that are in contact having interengaging parts adapted to guide their relative movements.

9. A radial truck comprising a frame, radially-movable axles, axle-boxes carried by said axles, and for each of said axle-boxes a link of which one end is pivotally connected thereto at the side thereof toward the center of the truck and which extends inwardly from the axle-box toward the center of the truck and a vertical pin by means of which the other end of said pin is pivoted to said frame, which rests on said link, each of said axle-boxes having at its side opposite to said link an extension which is longitudinal to the truck and by and on which said frame is supported and is adapted to slide.

10. A radial truck comprising a frame, radially-movable axles, axle-boxes carried by said axles, and for each of said axle-boxes a link of which one end is pivotally connected thereto at the side thereof toward the center of the truck and which extends inwardly from the axle-box toward the center of the truck and a vertical pin by means of which the other end of said pin is pivoted to said frame, which rests on said link, each of said axle-boxes having at its side opposite to said link an extension which is longitudinal to the truck and by and on which said frame is supported and is adapted to slide and the portions of said frame and said extension having interengaging parts adapted to guide their relative movements.

11. A radial truck comprising a frame, radially-movable axles, axle-box bodies supported by said axles, brackets which are carried by said axle-box bodies and extend longitudinally of the truck and by and upon which said frame is supported and adapted to slide.

12. A radial truck comprising a frame, radially-movable axles, axle-boxes carried by said axles, and for each of said axle-boxes a link pivotally connected thereto at one side thereof, each of said axle-boxes having at the other side thereof an extension which is longitudinal to the truck and by and on which said frame is supported and is adapted to slide and the portions of said frame and extension that are in contact having interengaging parts adapted to guide their relative movements so as to cause them to be substantially circular.

13. A radial truck comprising a frame, radially-movable axles, axle-boxes carried by said axles, and for each of said axle-boxes a link of which one end is pivotally connected thereto at the side thereof toward the center of the truck and which extends inwardly from the axle-box toward the center of the truck and a vertical pin by means of which the other end of said link is pivoted to said frame, which rests on said link.

14. A radial truck comprising a frame, radially-movable axles, axle-boxes carried by said axles, and for each of said axle-boxes a link of which one end is pivotally connected to the corresponding axle-box and a vertical pin by means of which the other end of said link is pivoted to said frame, which rests on said link.

15. A radial truck comprising a frame, radially-movable axles, axle-boxes supported by said axles, and for each pair of traveling wheels a pair of brake-blocks, and a carrier for said brake-blocks which is secured to the corresponding pair of axle-boxes so as to accompany the corresponding axle in its radial movement.

16. A radial truck comprising a frame, radially-movable axles, axle-boxes supported by said axles, and for each pair of traveling wheels a pair of brake-blocks, a carrier for said brake-blocks which is secured to the corresponding pair of axle-boxes so as to accompany the corresponding axle in its radial movement, an equalizing-brake-operating lever, transverse levers the inner ends of which are connected to said equalizing-lever, links connecting said transverse levers with said brake-blocks, and independent longitudinally-arranged rods jointed to the outer ends of said transverse levers and suspended from said frame.

Signed at Birmingham, England, this 20th day of July, 1905.

ELMER ELSWORTH COOK.

Witnesses:
    HENRY TUCKER,
    ELLEN BEATRICE SMITH.